United States Patent [19]

Therond

[11] Patent Number: 4,923,345

[45] Date of Patent: May 8, 1990

[54] DEVICE FOR ADJUSTING THE POSITION OF A TOOL-HODER HEAD ALONG AN AXIS AND PROCESS EMPLOYING IT

[75] Inventor: Marcel Therond, Rillieux-la-Pape, France

[73] Assignee: Technifor

[21] Appl. No.: 297,321

[22] Filed: Jan. 17, 1989

[30] Foreign Application Priority Data

Jan. 26, 1988 [FR] France .................................. 88 01091

[51] Int. Cl.$^5$ .......................... B23Q 1/28; B23B 47/26
[52] U.S. Cl. ..................................... 409/237; 408/235
[58] Field of Search ................ 408/235; 409/186, 193, 409/209, 218, 237, 241

[56] References Cited

U.S. PATENT DOCUMENTS 1,905,560 4/1933 Friedl ................................. 408/235
3,018,697 1/1962 Schroeder et al. ............. 408/235 X Primary Examiner—Steven C. Bishop
Attorney, Agent, or Firm—Dowell & Dowell

[57] ABSTRACT

A device and process for adjusting the position of a tool-holder head along an axis with the tool-head moving along a guiding element and with a pulley mounted to rotate freely on a shaft secured to the tool-holder head and which is moveable along a taut cable. A maneuvering handle is provided and may be in mesh with the pulley in order to drive it or may be moved away therefrom so as to be free to rotate on the shaft.

10 Claims, 2 Drawing Sheets

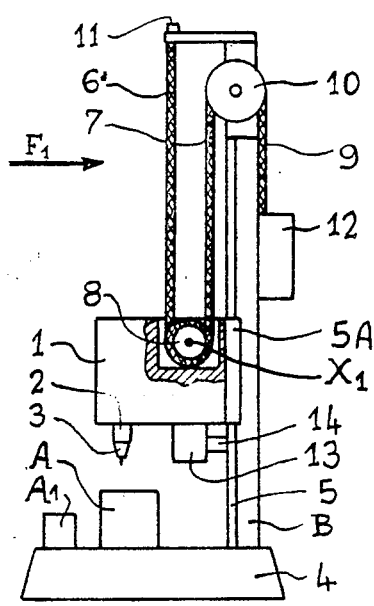
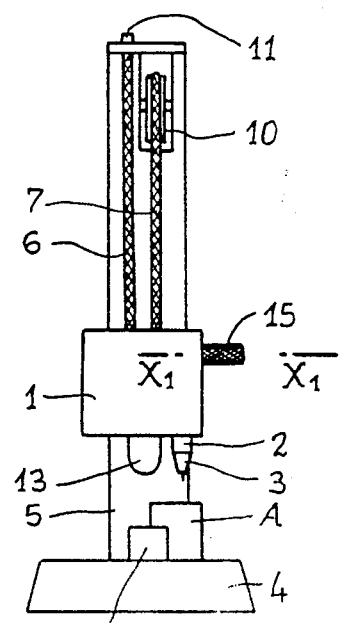
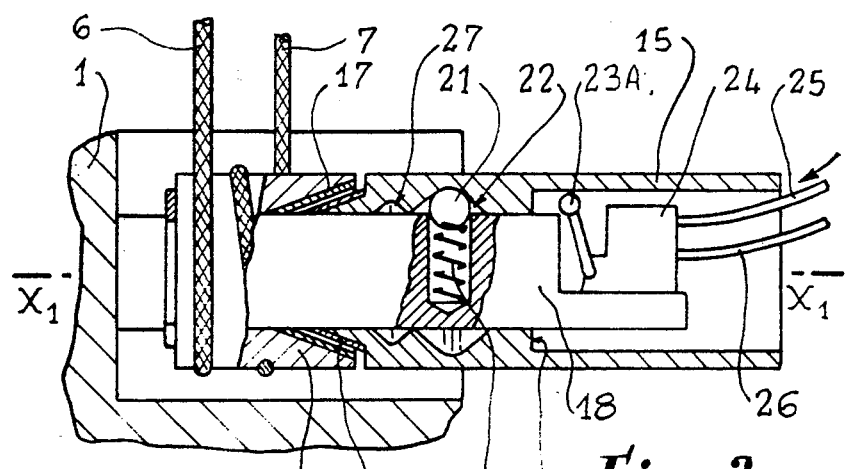

4,923,345

DEVICE FOR ADJUSTING THE POSITION OF A TOOL-HODER HEAD ALONG AN AXIS AND PROCESS EMPLOYING IT

FIELD OF THE INVENTION

The present invention relates to a device for adjusting the position of a tool-holder head along an axis and to a process employing it, the device and process concerning a tool-holder head, mobile along an axis and whose working position is adjustable as a function of the dimensions of the workpiece on which the tool mounted on the tool-holder is to work.

This device is concerned with tool-holder heads fitted with tools of all types, such as drilling, milling or like tools. It concerns more particularly tool-holder heads fitted with a tool for marking or engraving.

BACKGROUND OF THE INVENTION

To bring a tool-holder head to its working position, a screw and nut mechanism actuated manually or by a drive means, is most often used. Such a mechanism is relatively slow, in particular if a sufficient precision and also irreversibility are desired. In practice, when it is desired to effect, for example, operations of marking or of engraving on different workpieces, or at different points of the same workpiece, the time of adjustment represents a considerable fraction of the time of execution.

A device is sought which makes it possible to effect such an adjustment of position of a tool-holder head mobile along an axis, in a manner much simpler and more rapid than by known means.

In particular, it is sought to effect, by hand, a rapid approach of the position of use, followed by a precise and relatively rapid adjustment, the two operations being carried out consecutively without wasting time. It is also sought to produce a device allowing the displacement of a tool-holder head along a vertical or horizontal axis or one forming any angle with respect to the horizontal.

Finally, it is sought to ensure, simply and efficiently, blocking of the tool-holder head along its axis during the period of work of the tool.

The device and process according to the present invention enable such results to be attained.

The adjusting device according to the invention makes it possible to displace a mobile tool-holder head along an axis in order to take it rapidly and precisely to any location chosen along this axis.

SUMMARY OF THE INVENTION

This device comprises a guiding means, oriented along the axis of displacement with which cooperates a sliding connection means, fast with the tool-holder head which allows the displacement thereof along this guiding means and therefore along this axis of displacement. The tool-holder head comprises a pulley mounted to rotate freely on a shaft around which a taut cable, of which at least one of the two ends is fixed in the vicinity of one of the ends of the guiding means, makes at least one half turn; a manoeuvring handle, mounted to rotate freely about the shaft which bears the pulley, is mobile in translation on this shaft so as to be able either to abut against the lateral wall of the pulley, via contact surfaces which cooperate so as to bring the manoeuvring handle and the pulley into mesh, or, on the contrary, to move away from the pulley so that the contact surfaces no longer cooperate and the manoeuvring handle and the pulley are free to rotate with respect to each other.

The sliding connection means of the tool-holder head is preferably provided with a locking means, actuated by a control means with which cooperates the manoeuvring handle by displacement in translation along the shaft which bears it. The locking means, under the action of the control means, effects either blocking of the tool-holder head at the place where it lies along the guiding means, or, on the contrary, releases this tool-holder head in order to allow a displacement along the guiding means.

When the axis of the guiding means of the tool-holder head is vertical or inclined with respect to the horizontal, one end of the cable is fixed to the upper end of the guiding means, the cable then makes at least one half-turn around the pulley mounted on the tool-holder head, then returns to the vicinity of the upper end of the guiding means where it passes over a guide pulley beyond which it is fixed to a counterweight which performs the role of tensioning device and of balance weight.

When the axis of the guiding means is substantially horizontal, the cable, of which one of the ends is fixed in the vicinity of one of the ends of the guiding means, makes at least one turn around the pulley mounted on the tool-holder head and extends up to the vicinity of the other end of the guiding means where a tensioning device maintains the cable taut on either side of the pulley.

According to a first embodiment of the manoeuvring handle, an elastic retaining means maintains the manoeuvring handle in position spaced apart from the pulley, so that this handle is free to rotate.

This elastic retaining means may be a ball pushed by a spring disposed in a substantially radial housing made in the shaft which supports the manoeuvring handle. This ball cooperates with a first annular groove formed in the inner wall of the handle so as to prevent displacement thereof along the shaft. The characteristics of this elastic retaining means, and the profile of the groove, are determined so as to allow the displacement of the manoeuvring handle along the shaft, in the direction of the pulley or in opposite direction, under the action of a force exceeding a well-defined value.

A second annular groove may advantageously be formed in the inner wall of the manoeuvring handle so as to cooperate with the ball of the elastic retaining means for a position of the manoeuvring handle located at a different distance from the pulley, position in which the manoeuvring handle cooperates with the control means which actuates the locking means and thus blocks the tool-holder head.

According to a second embodiment of the manoeuvring handle, the control means of the locking means is housed in a location surrounded by the inner wall of the manoeuvring handle. A radial rod, pushed outwardly by an elastic means, acts on this control means so as to provoke blockage of the tool-holder head via the locking means, when the end of this radial rod engages in a groove made in the inner wall of the manoeuvring handle.

The characteristics of this rod and of the elastic thrust means, as well as the profile of the groove, are determined so as to allow the displacement of the manoeuvring handle along the shaft in the direction of the pulley, or in the opposite direction, under the action of a force exceeding a well-defined value. The emergence of the end of the rod from the groove under the action of such a force provokes unblocking of the tool-holder head.

Such unblocking is obtained either when the manoeuvring handle is pushed towards the pulley so as to bring their contact surface into mesh, or when the manoeuvring handle is pushed away from the pulley so as to be able to displace the tool-holder head manually.

The invention also relates to a process for adjusting a tool-holder head provided with a sliding connection means which enables it to move along an axis along a guiding means in order to bring this tool-holder head to any chosen point along this axis, in a minimum of time and with sufficient precision.

According to this process, in a first phase, the tool-holder head is rapidly displaced along the guiding means, being driven by means of a manoeuvring handle mounted to rotate freely on a shaft, so as to bring it in the vicinity of the chosen point; in a second phase, the manoeuvring handle is displaced along the shaft so as to return into mesh with a pulley via contact surfaces arranged on the pulley and the handle so as to cooperate, then this handle is rotated in the desired direction to displace this pulley—and therefore the tool-holder head on which it is mounted—along a taut cable which makes at least one half-turn around the pulley and which is fixed by at least one of its ends to one end of the guiding means, and finally, the rotation of the handle is interrupted as soon as the tool-holder head reaches the chosen point.

The tool-holder head is advantageously blocked when it has reached the chosen point by displacing the manoeuvring handle along the shaft which bears it, moving it away from the pulley so that it acts on a control means which provokes locking of the sliding connection between the tool-holder head and the guiding means.

BRIEF DESCRIPTION OF THE DRAWINGS

The invention will be more readily understood on reading the following description with reference to the accompanying drawings, in which:

FIG. 1 is a schematic view in elevation of a first embodiment of the device according to the invention.

FIG. 2 is a view, in the direction of arrow F1, of the device of FIG. 1.

FIG. 3 is a schematic view in partial section, and on a larger scale, along a plane containing axis X1—X1, of the mode of mounting the pulley and the manoeuvring handle of the device of FIGS. 1 and 2.

DETAILED DESCRIPTION OF THE DRAWINGS

Figure 4:
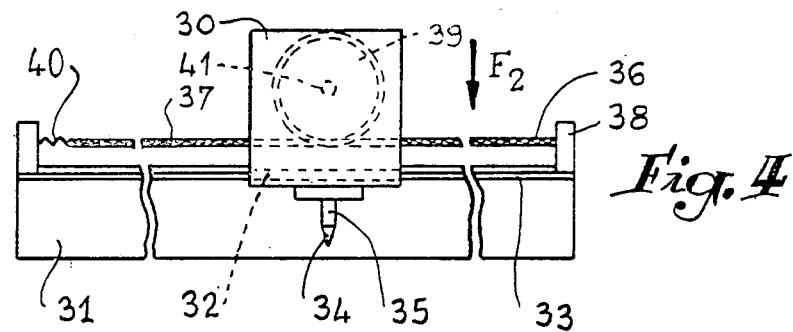
FIG. 4 is a schematic view in elevation of a second embodiment of the device according to the invention.

FIGS. 1 to 3 schematically show a first embodiment of the device according to the invention.

The tool-holder head 1 may move along a vertical axis along a guiding means B. This tool-holder head comprises a marking tool 3 mounted on a support 2, adapted to displace the tool in a horizontal plane along two axes in known manner (not shown).

Means for driving this support 2, likewise known and not shown, make it possible to actuate it in determined manner. The guiding means B is provided with vertical slideways 5 along which the tool-holder head 1 moves thanks to the sliding connection means 5A. The guiding means is supported by a base piece 4 on which are disposed workpieces A and A1 which are to be marked.

The tool-holder head 1 is supported by a cable of which one of the ends is fixed at 11 to the upper end of the guiding means B.

Part 6 of this cable is stretched between the point of fixation 11 and the pulley 8. The cable then makes one and a half turns around this pulley, as shown in FIG. 3, then is returned at 7 upwardly, then, after passage over a guide pulley 10, redescends at 9, its end being attached to a counterweight 12. This counterweight performs the role of cable tensioning device and of balance weight of the tool-holder head.

As shown in FIG. 3, the manoeuvring handle 15 is mounted to rotate freely on a shaft 18. The same applies for pulley 8. The handle 15 and the pulley 8 comprise corresponding contact surfaces 16, 17, of male and female truncated shape, which mesh with each other when the handle 15 is pushed along the shaft in the direction of the pulley 8. A good adherence is obtained by covering these contact zones 16 and 17 with a rubberized material. An elastic retaining means makes it possible to maintain the handle 15 spaced apart from the pulley 8, so as to separate the contact zones 16 and 17 from each other when it is desired to make a rapid displacement of the tool-holder head 1, by acting directly on the manoeuvring handle 15. This retaining means comprises a ball 21 pushed radially by a spring 20 housed in the shaft 18. This ball 21 engages in the first annular groove 22 formed in the inner wall of the manoeuvring handle 15 when the latter is sufficiently moved apart from the pulley 8. By exerting a sufficient thrust on the manoeuvring handle, it may either be meshed with the pulley 8, or brought into contact with a control means 23A by an annular stop 23B, which displaces this control means until the compressed air circuit 25, 26 is established by opening the valve 24. This circuit actuates the locking means constituted by a jack 13 of which the rod 14 comes into abutment on the slideway 5. The tool-holder head is then blocked in the position where it lies on the guiding means, this making it possible to effect any marking operation without risk of vertical displacement of this tool-holder head. In order to maintain the handle 15 in the locking position, a second annular groove 27 is formed in the inner wall of the manoeuvring handle 15, so that the ball 21 engages therein when the handle is in abutment against the control means 23A in the open position of valve 24.

Figure 5:
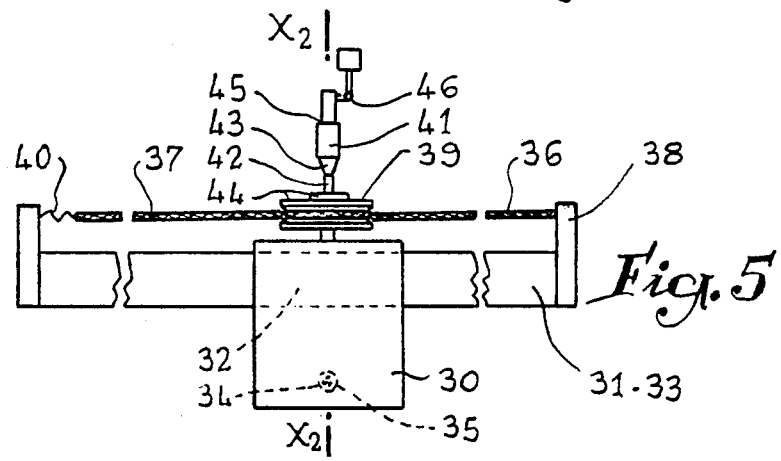
FIG. 5 is a view, in the direction of arrow F2, of the device of FIG. 4.

FIGS. 4 and 5 schematically show a second embodiment of the device according to the invention.

These Figures show a tool-holder head 30 which may move on a horizontal axis along a guiding means 31. A sliding connection means 32, fast with the tool-holder head 30, moves along slideways 33. The tool-holder head 30 comprises a marking tool 34 mounted on a support 35. A cable 36, 37 is fixed to one end 38 of the guiding means 31, then, after having turned completely around the grooved pulley 39, is connected to the other end of the guiding means by a stretching device 40, constituted by a helical spring, which ensures tensioning of the cable, with the result that this cable does not slide around the pulley when the latter is rotated.

As in the case of FIG. 3, a manoeuvring handle 41 is mounted to rotate freely on a shaft 42 of axis X2—X2, on which the pulley 39 is also free to rotate. Contact surfaces 43, 44 coated with rubber, make it possible to mesh the manoeuvring handle 41 and the pulley 39, by exerting a sufficient pressure of the handle in the direction of the pulley. On the contrary, when the manoeuvring handle 41 is spaced apart from the pulley 39, it suffices to exert a sufficient thrust on this manoeuvring handle 41, in a direction parallel to the axis of the guiding means, in order rapidly to displace the tool-holder head 30 along this guiding means 31, up to the vicinity of the point which it is proposed to attain. A precise adjustment is then made by meshing the contact surfaces 43, 44 of the manoeuvring handle and the pulley, then by rotating the handle in the desired direction so as to displace the pulley along the cable, and therefore the tool-holder head along the guiding means by the amount necessary to attain the point aimed at. It is then possible, by moving the handle 41 away from the pulley 39, to actuate, by the outer edge 45 of the handle, the control means 46, shown purely schematically, which provokes locking of the tool-holder head on the guiding means, thanks to a jack (not shown).

Numerous modifications may be made to the device according to the invention described in FIGS. 1 to 5. For example, the pulley 8 (FIG. 3) may comprise a groove like pulley 39 (FIG. 5). The spring 40 (FIG. 4) may be replaced by another tensioning device, such as a jack, a weight or the like.

The locking means is not necessarily a jack, but an electrically actuated lock for example.

The contact surfaces 16, 17 or 43, 44 of FIGS. 3 and 5 may possibly comprise parts in relief and recesses, such as toothing, which cooperate to avoid any slide.

The manoeuvring handle 15 (FIG. 3) may comprise a third groove which cooperates with the ball 21, to maintain the contact surfaces 16, 17 in mesh for the time necessary for adjusting the position of the tool-holder head 1.

Figure 6:
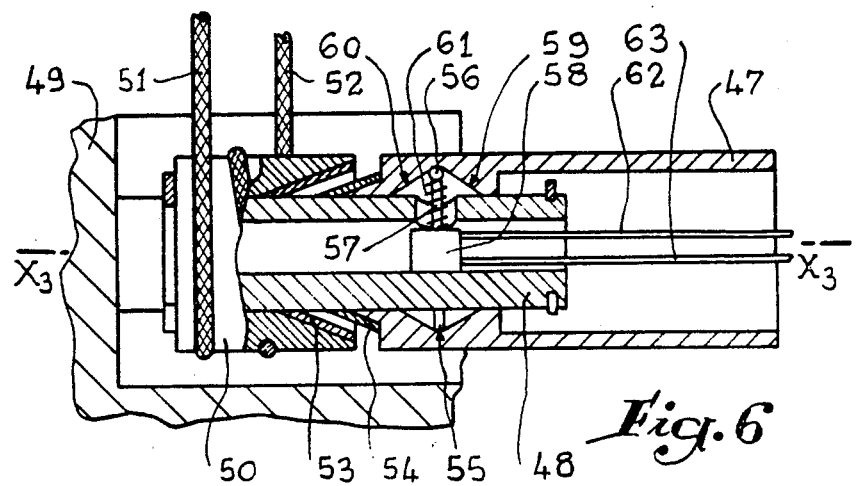
FIG. 6 shows, on a larger scale, a particular embodiment of the manoeuvring handle according to the invention.

Finally, FIG. 6 shows a second embodiment of the manoeuvring handle of a device such as the one of FIG. 3. In this FIG. 6, a manoeuvring handle 47 is mounted to rotate freely and slidingly on shaft 48, fast with a tool-holder head 49, of which only the zone of fixation of shaft 48 is visible. This tool-holder head 49 is adapted to move vertically by sliding on vertical slideways (not shown). It is supported in the same way as the tool-holder head 1 by a taut cable which makes one and a half turns around the pulley 50, and of which the two parts 51, 52 are connected, one to a fixed point and the other to a counterweight (neither shown).

The truncated surfaces 53, 54 make it possible to mesh the pulley 50, free to rotate on shaft 48, and the manoeuvring handle 47, by bringing the latter closer to the pulley until the truncated surfaces 53, 54 come into contact.

Thanks to the particular profile of the groove 55, in which is housed the end 56 of the radial rod 57 which controls the valve 58, this displacement of the manoeuvring handle 47 radially pushes the rod 57 towards axis X3—X3 by slide of the end ball 56 on the connection shoulder 59. This results in a closure of the valve 58 which was previously open. Such closure provokes unblocking of the tool-holder head 49 by the locking means (not shown) which is connected to the valve 58 by pneumatic control fluid pipes 62, 63.

This unblocking therefore allows rotation of the pulley 50 by the manoeuvring handle 47, and the corresponding displacement of the tool-holder head 49 along its guiding means. In order to block the tool-holder head 49 again, by opening the valve 58, it suffices to move the manoeuvring handle 47 away from the pulley until the end ball 56 of the radial control rod 57 engages again in groove 55, under the thrust of the helical spring 61 which ensures elastic retention of the manoeuvring handle in this blocking position. The manoeuvring handle 47 may be moved further away, so as to close valve 58 again by slide of the ball 56 on the connection shoulder 60. A position is then reached for which the manoeuvring handle makes it possible, by manual displacement, to obtain a very rapid slide of the tool-holder head along the guiding means with free rotation of the pulley 50.

What is claimed is:

1. A process for adjusting a tool-holder head provided with a sliding connection means which enables it to move along an axis along a guiding means up to any chosen point along this axis, wherein it comprises the following steps:
   in a first phase, effecting a rapid displacement of the tool-holder head along a guiding means, it being driven by means of a manoeuvring handle mounted to rotate freely on a shaft so as to bring it in the vicinity of the chosen point, and
   in a second phase, displacing the manoeuvring handle along the shaft so as to come into mesh with a pulley thanks to contact surfaces made on the pulley and the handle so as to cooperate, then turning this handle in the desired direction in order to displace this pulley, and therefore the tool-holder head on which it is mounted, along a taut cable which makes at least one half-turn around the pulley, and which is fixed by at least one of its ends in the vicinity of one end of the guiding means, and, finally, interrupting rotation by means of the manoeuvring handle as soon as the tool-holder head has reached the chosen point.

2. The process of claim 1, wherein the tool-holder head is blocked when it reaches the chosen point by displacing the manoeuvring handle along the shaft which bears it, moving it away from the pulley until it acts on a control means which provokes locking of the sliding connection between the tool-holder head and the guiding means.

3. In an adjusting device for displacing a moveable tool-holder head along an axis to take it rapidly and precisely to any chosen point along the axis the improvement comprising, a guiding means having first and second ends, said guiding means being oriented adjacent the axis, a sliding connection means moveably mounted to said guiding means, the tool-holder head being carried by said sliding connection means so as to allow the displacement thereof along said guiding means, the tool-holder head including a pulley having a lateral wall, said pulley being mounted to freely rotate on a shaft around which a cable makes at least one-half turn, said cable having opposite ends, one of said ends of said cable being connected to one of said ends of said guiding means, a maneuvering handle having an inner wall mounted to freely rotate about said shaft, said shaft carrying said pulley, said handle having inner contact walls and being axially moveable on said shaft so as to either abut said inner contact walls against said lateral wall of said pulley or to move said inner contact walls away from said pulley so that said inner contact walls no longer engage said lateral wall of said pulley so that said maneuvering handle and said pulley are free to rotate with respect to one another.

4. The device of claim 3 wherein said sliding connection means of the tool-holder head is provided with a locking means, a control means engageable by said handle for moving said locking means as said maneuvering handle is moved along said shaft, said locking means being actuated by said control means to engage said guiding means to retain the tool-holder head in fixed relationship with respect to said guiding means.

5. The device of claim 4 wherein said control means is carried by said shaft and is surrounded by said inner wall of said maneuvering handle, a valve associated with said control means, said handle having a stop means for engaging said control means to actuate said valve associated therewith.

6. The device of claim 3 wherein said guiding means is disposed along a substantially horizontal axis, said cable making at least one turn around said pulley mounted on the tool-holder head and extending to the vicinity of said second end of said guiding means, and a tensioning device for maintaining said cable taut with respect to said pulley.

7. The device of claim 3 including an elastic retaining means for locking the maneuvering handle in a position spaced apart from said pulley.

8. The device of claim 7 wherein the elastic retaining means includes a ball, a spring disposed in a substantially radial housing made in said shaft which supports said maneuvering handle, said spring engaging said ball, said ball cooperating with a first annular groove formed in said inner wall of said maneuvering handle so as to prevent the displacement of said handle along said shaft.

9. The device of claim 8 wherein a second annular groove is formed in said inner wall of said maneuvering handle, said second groove being spaced from said first groove a distance so that said ball of said retaining means engages within said second groove when the maneuvering handle is moved relatively away from said pulley.

10. The device of claim 9, wherein the sliding connection means of the tool-holder head is provided with a locking means, a control means carried by said shaft so as to be engageable by said maneuvering handle as said maneuvering handle is moved away from said pulley so that said ball engages in said second groove, said control means actuating said locking means so as to retain the tool-holder head in fixed relationship with respect to said guiding means.

* * * * *